US009972275B2

(12) United States Patent
Xie

(10) Patent No.: US 9,972,275 B2
(45) Date of Patent: May 15, 2018

(54) CONTENT PRESENTATION SYSTEM AND METHOD

(71) Applicant: ATI TECHNOLOGIES ULC, Markham (CA)

(72) Inventor: Bin Xie, Richmond Hill (CA)

(73) Assignee: ATI Technologies ULC, Markham, Ontario (CA)

( * ) Notice: Subject to any disclaimer, the term of this patent is extended or adjusted under 35 U.S.C. 154(b) by 976 days.

(21) Appl. No.: 13/894,421

(22) Filed: May 14, 2013

(65) Prior Publication Data

US 2014/0344605 A1  Nov. 20, 2014

(51) Int. Cl.
*G06F 1/32* (2006.01)
*G09G 5/00* (2006.01)

(52) U.S. Cl.
CPC ............. *G09G 5/00* (2013.01); *G06F 1/3293* (2013.01); *G06F 1/3203* (2013.01); *G09G 2330/021* (2013.01); *G09G 2380/14* (2013.01); *Y02B 60/121* (2013.01); *Y02B 60/32* (2013.01)

(58) Field of Classification Search
CPC ....... G06F 1/3287; G06F 1/3293; G09G 5/00; G09G 2330/021; G09G 2380/14; Y02B 60/32; Y02B 60/121
USPC ........................................................ 713/324
See application file for complete search history.

(56) References Cited

U.S. PATENT DOCUMENTS

| | | | |
|---|---|---|---|
| 6,075,918 A | 6/2000 | Strongin et al. | |
| 6,266,714 B1 * | 7/2001 | Jacobs et al. | 710/14 |
| 7,522,964 B2 * | 4/2009 | Du et al. | 700/94 |
| 7,962,775 B1 * | 6/2011 | Vaidyu et al. | 713/323 |
| 2008/0072014 A1 * | 3/2008 | Krishnan et al. | 712/43 |
| 2011/0124375 A1 * | 5/2011 | Stuivenwold | G06F 1/3203 455/566 |

* cited by examiner

*Primary Examiner* — Jaweed A Abbaszadeh
*Assistant Examiner* — Volvick Derose
(74) *Attorney, Agent, or Firm* — Faegre Baker Daniels LLP

(57) ABSTRACT

The present disclosure relates to a method and system for content presentation in a main processor shutoff mode. A method for content presentation includes transferring content to at least one of a co-processor and storage accessible by the co-processor and shutting off the main processor in response to the transferring of content such that the main processor is disabled while the co-processor presents the content stored in the storage. The content may include at least one of multimedia data, text data, and image data. A disclosed system includes a main processor in communication with a co-processor. The main processor includes data transfer logic operative to transfer the content and to shut off the main processor in response to the transferring of content such that the main processor is disabled while the co-processor presents the content stored in the storage.

40 Claims, 8 Drawing Sheets

CONTENT PRESENTATION SYSTEM AND METHOD

FIELD OF THE DISCLOSURE

The present disclosure is generally related to content presentation by a computer system, and more particularly to methods and systems for presenting content in a main processor shutoff mode.

BACKGROUND

Computing systems are configured to present various types of content to a user. Exemplary computing systems for content presentation include laptops, desktops, tablets, smartphones, other multimedia players, electronic books (e-books), and other systems and devices. The types of content presented by such systems includes, for example, multimedia, images, text, other documents, etc. Multimedia playback systems play back multimedia data, such as audio and video data, on one or more displays and/or speakers. E-books are operative to present document, text, and/or images on one or more displays. Some computing systems are operative to present multiple types and formats of content. However, most computing systems do not support all content types and formats. For example, computing systems are often limited in the ability to present some content formats based on the operating system (e.g., Microsoft Windows, Mac OS, Linux, etc.) or applications executed by the computing system. Other system incompatibilities may limit computing systems from displaying or playing back certain types and formats of content.

Further, computing systems often consume large amounts of power when presenting content to a user. FIG. 1 illustrates an exemplary known content presentation system 10 including a main processor 12, illustratively a central processing unit (CPU) 12, in communication with a co-processor 14, illustratively a graphics processing unit (GPU) 14. CPU 12 and GPU 14 communicate over a communication interface 16, such as a Peripheral Component Interconnect (PCI) Express interface, universal serial bus (USB) interface, or other suitable interface. Content presentation system 10 may include a computing system such as a laptop, desktop, mobile device (e.g., tablet, smartphone, etc.), other multimedia player, or other system or device. CPU 12 includes an operating system stored in memory and configured to execute one or more applications stored in memory. A power management controller 18 is configured to manage the consumption and allocation of power by CPU 12 from a power source 26. Power management controller 18 may be internal or external to CPU 12. Power down logic 20 of power management controller 18 is operative to power down CPU 12 in one or more power down modes, such as a sleep mode, a hibernate mode, and a shutdown mode, for example. In each of the power down modes provided with power down logic 20 of FIG. 1, both the CPU 12 and GPU 14 are powered off, thereby disabling CPU 12 and GPU 14. CPU 12 includes a memory controller (not shown) operative to control access to system memory, illustratively system random access memory (RAM) 22, and to mass storage 24 for read/write operations. Mass storage 24 may include a hard drive, a solid-state drive (SSD), or flash drive, for example.

GPU 14 processes data based on instructions from CPU 12 (and/or another processor). In one embodiment, one or more processing cores 30 of GPU 14 is operative to process graphics data, such as video and image data, as well as general-purpose data used for producing non-graphical outputs. GPU 14 may output processed data to a memory buffer 36, such as a frame buffer 36, for displaying the data on a monitor 38. GPU 14 includes a memory controller (not shown) for accessing system RAM 22 and memory buffer 36 of computing system 10. GPU 14 may further include onboard device memory 32, such as dedicated RAM 32, for storing data during operation. GPU 14 and CPU 12, as well as interface 16, system RAM 22, and mass storage 24, receive power from power source 26 of computing system 10 for consumption by the respective components and devices. GPU 14 may include a power manager (not shown) for controlling distribution of power to components of GPU 14. CPU 12 and GPU 14 may cooperate to display a screen saver image on monitor 38 wherein both CPU 12 and GPU 14 are functioning and consuming power during the display of the screen saver.

CPU 12 manages the presentation of content by the computing system 10. As such, during the presentation of content with computing system 10, the CPU 12 and GPU 14, as well as mass storage 24, network interface 28, and/or other components, are operating and consuming power. Operating all of these components during the presentation of content may consume unnecessary power, increase the heat generated by the system, and reduce the efficiency and/or battery life of the system.

Therefore, a need exists for methods and systems to reduce power consumption during the presentation of content by a computing system. Further, a need exists for methods and systems to allow content to be presented regardless of content format.

SUMMARY OF EMBODIMENTS OF THE DISCLOSURE

In an exemplary embodiment of the present disclosure, a method of content presentation carried out by a computer system is provided. The method includes transferring, by a main processor of the computer system, content to at least one of a co-processor and storage accessible by the co-processor in response to a request for presentation of the content in a main processor shutoff mode. The content is stored in the storage accessible by the co-processor for presentation by the co-processor in the main processor shutoff mode. The content includes at least one of multimedia data, text data, and image data. The method further includes shutting off the main processor in response to the transferring of content such that the main processor is disabled while the co-processor presents the content stored in the storage.

Among other advantages in certain embodiments, the method and system of the present disclosure allow for the presentation of multiple types and formats of content by a computing system with one or more components of the computing system powered off. Exemplary powered off components include the main processor, the mass storage device, other memory, network and/or communication interfaces, and/or other suitable components. As such, the method and system serve to minimize or reduce power consumption by the computing system during content presentation. In addition, the method and system serve to present multiple formats of content by converting incompatible content formats into content formats that are compatible for presentation by the computing system. Other advantages will be recognized by those of ordinary skill in the art.

In one example, the content includes multimedia data, and the method further includes, in response to the request, transcoding the multimedia data into a multimedia format readable by the co-processor. In another example, the content includes multimedia data, and the method further includes instructing, by the main processor, the co-processor to transcode the multimedia data into a multimedia format readable by the co-processor and to store the transcoded multimedia data in the storage accessible by the co-processor. In yet another example, the content includes at least one of image data and text data, and in the main processor shutoff mode the co-processor is operative to display the at least one of image data and text data on a computer monitor of the computer system with the main processor disabled. In this example, the method further includes converting, with a printer driver of the main processor, the at least one of image data and text data into a data format readable by the co-processor. In one example, the transferring further includes instructing content presentation logic of the co-processor to maintain power to the co-processor in the main processor shutoff mode and to present the content with the main processor powered off.

In another exemplary embodiment of the present disclosure, a method of content presentation by a computer system is provided. The method includes receiving, by content presentation logic of a computer system, a request for presentation of content in a main processor shutoff mode. The content includes at least one of multimedia data, text data, and image data. The method includes maintaining power to a co-processor in response to the request for presentation of the content in the main processor shutoff mode. The method further includes presenting, by the co-processor in response to the request, the content while the main processor is disabled. In one example, in a normal operation mode with the main processor enabled, a communication interface is operative to communicate signals to the co-processor based on signals received from the main processor. In this example, the method further includes providing, by the content presentation logic in the main processor shutoff mode, signals to the co-processor that mimic the signals communicated to the co-processor via the communication interface in the normal operation mode. In another example, the method further includes blocking signals from the communication interface to the graphics processor in the main processor shutoff mode.

In yet another exemplary embodiment of the present disclosure, a method of content presentation by a computer system is provided. The method includes transferring, by a main processor of the computer system, content to at least one of a graphics processor of the computer system and storage accessible by the graphics processor in response to a request for presentation of the content in a main processor shutoff mode. The content includes at least one of multimedia data, text data, and image data. The method includes storing the content in the storage accessible by the graphics processor for presentation by the graphics processor in the main processor shutoff mode. The method further includes shutting off the main processor in response to the transferring of content such that the main processor is disabled. The method further includes presenting, by the graphics processor, the content stored in the storage while the main processor is disabled.

In still another exemplary embodiment of the present disclosure, a computer system for content presentation is provided. The computer system includes a main processor in communication with a co-processor of the computer system. The main processor includes data transfer logic operative to transfer content to at least one of the co-processor and storage accessible by the co-processor in response to a request for presentation of the content in a main processor shutoff mode. The content is stored in the storage accessible by the co-processor for presentation by the co-processor in the main processor shutoff mode. The content includes at least one of multimedia data, text data, and image data. The data transfer logic is further operative to shut off the main processor in response to the transferring of content such that the main processor is disabled while the co-processor presents the content stored in the storage.

In another exemplary embodiment of the present disclosure, a computer system for content presentation is provided. The computer system includes a co-processor in communication with a main processor of the computer system. The co-processor includes content presentation logic operative to receive a request for presentation of content in a main processor shutoff mode and to maintain power to the co-processor in response to the request. The content includes at least one of multimedia data, text data, and image data. The co-processor is operative to present the content in response to the request while the main processor is disabled.

In yet another exemplary embodiment of the present disclosure, a computer system for content presentation is provided. The computer system includes a graphics processor, storage accessible by the graphics processor, and a main processor in communication with the graphics processor. The main processor includes data transfer logic operative to transfer content to at least one of the graphics processor and the storage accessible by the graphics processor in response to a request for presentation of the content in a main processor shutoff mode. The transferred content is stored in the storage accessible by the graphics processor. The data transfer logic is further operative to shut off the main processor in response to the transferring such that operation of the main processor is disabled in the main processor shutoff mode. The graphics processor is operative to present the content stored in the storage in the main processor shutoff mode with the main processor disabled. The content includes at least one of multimedia data, text data, and image data.

BRIEF DESCRIPTION OF THE DRAWINGS

The invention will be more readily understood in view of the following description when accompanied by the below figures and wherein like reference numerals represent like elements.

DETAILED DESCRIPTION

The term "logic" or "control logic" as used herein may include software and/or firmware executing on one or more programmable processors, application-specific integrated circuits (ASICs), field-programmable gate arrays (FPGAs), digital signal processors (DSPs), hardwired logic, or combinations thereof. Therefore, in accordance with the embodiments, various logic may be implemented in any appropriate fashion and would remain in accordance with the embodiments herein disclosed.

Figure 1:
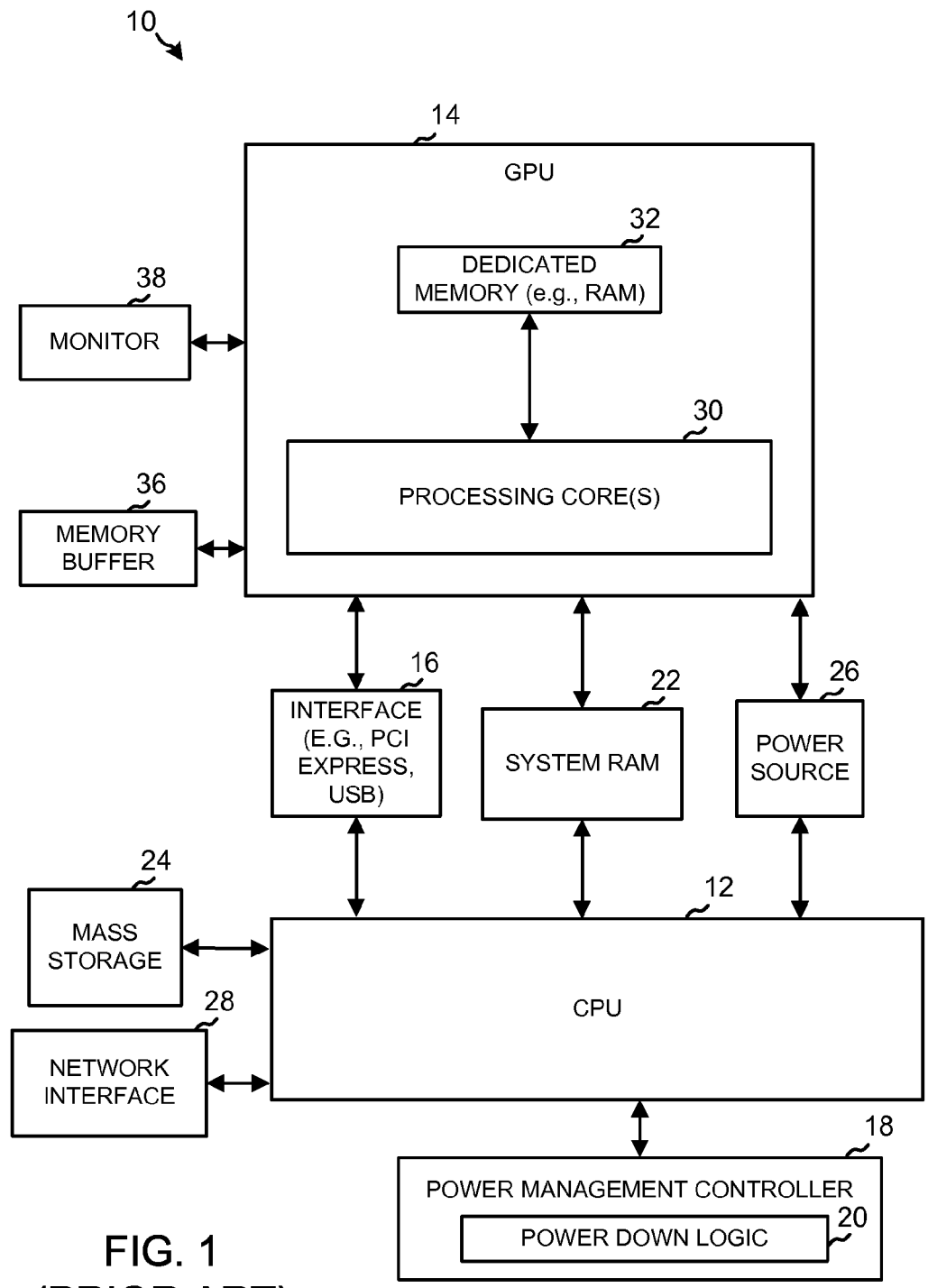
FIG. 1 is a block diagram of a prior known computing system including a graphics processing unit (GPU) and a central processing unit (CPU)
Figure 2:
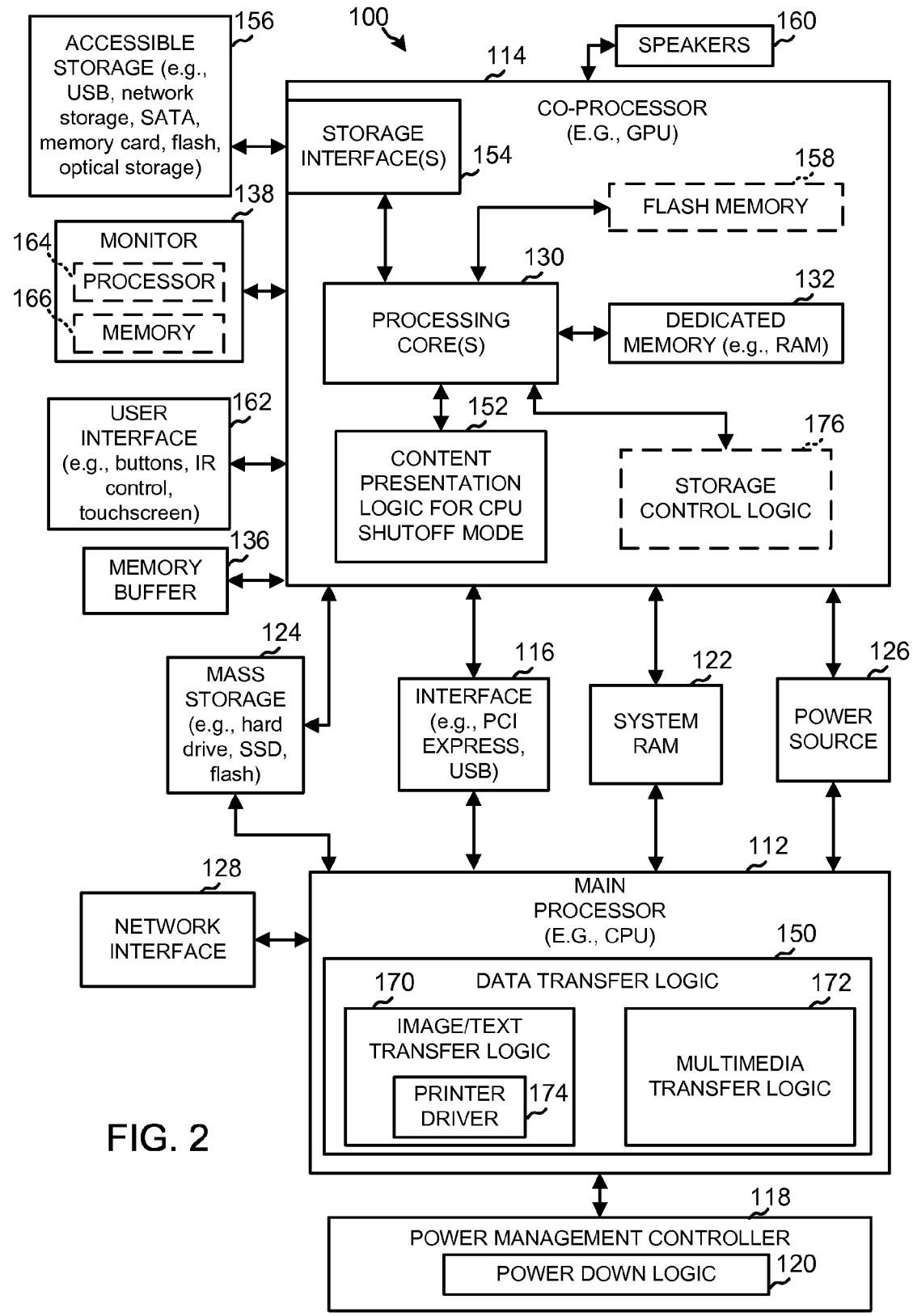
FIG. 2 is a block diagram of a content presentation system in accordance with some embodiments including a main processor with data transfer logic and a co-processor with content presentation logic.

FIG. 2 illustrates an exemplary content presentation system 100 according to various embodiments that is configured to present content in a main processor shutoff mode. Content presentation system 100 may be viewed as modifying the known system 10 described in FIG. 1. For example, main processor 112 of FIG. 2 may be viewed as a modification of the main processor 12 of FIG. 1, and co-processor 114 of FIG. 2 may be viewed as a modification of the co-processor 14 of FIG. 1. Like components of system 10 of FIG. 1 and system 100 of FIG. 2 are provided with like reference numbers. Various other arrangements of internal and external components and corresponding connectivity of content presentation system 100, that are alternatives to what is illustrated in the figures, may be utilized and such arrangements of internal and external components and corresponding connectivity would remain in accordance with the embodiments herein disclosed.

Types of content presented with content presentation system 100 may include multimedia data, such as audio and video data, for example, configured for playback over one or more computer monitors 138 and/or speakers 160. Further, other types of content presented with content presentation system 100 may include image, text, and other document data configured for display on one or more computer monitors 138. Image and text data may include photos, documents, spreadsheets, drawings, image files, text files, electronic books, other documents, and other suitable images and text. Other suitable types of content may be presented with content presentation system 100. The content presented with content presentation system 100 may include local content stored on storage local to system 100, content stored on storage removable from system 100, remote content stored on remote storage, such as content accessible and/or streamed over a network (e.g., Internet, Ethernet, Bluetooth, WiFi, etc.), and content provided from any other suitable source location.

Referring to FIG. 2, exemplary content presentation system 100 is illustrated that incorporates the data transfer logic 150 and content presentation logic 152 of the present disclosure. Content presentation system 100 includes any suitable computing system that includes a main processor 112 and a co-processor 114 and that is operative to present content to a user. An exemplary content presentation system 100 includes a laptop, desktop, mobile device (e.g., tablet, smartphone, etc.), other multimedia player, electronic book (e-book), or other system or device operative to present content. System 100 includes main processor 112 and co-processor 114 in communication via a communication interface or bus 116. In one embodiment, main processor 112 is a CPU 112, although another type of main processor 112 may be provided. In one embodiment, co-processor 114 is a GPU 114, although another type of co-processor 114 may be provided such as, for example, a non-graphics processor. Communication interface 116, illustratively external to main processor 112 and co-processor 114, communicates data and information between main processor 112 and co-processor 114. Interface 116 may alternatively be integrated with main processor 112 and/or with co-processor 114. An exemplary communication interface 116 is a PCI Express interface or a USB interface.

Main processor 112 provides the overarching command and control for content presentation system 100. In one embodiment, main processor 112 includes an operating system for managing task allocation and scheduling for computing system 100. The operating system of main processor 112, which is stored in memory accessible by main processor 112, executes one or more applications or programs, such as software or firmware stored in memory external or internal to main processor 112. As described herein, main processor 112 offloads various computing and content presentation tasks to co-processor 114 and/or to display processor 164.

Main processor 112 and co-processor 114 are illustratively separate devices but may alternatively be integrated as a single chip device. Co-processor 114 includes one or more processing cores or engines 130. In one embodiment, multiple cores 130 are provided that cooperate to provide a parallel computing structure, although other configurations may be provided. In one embodiment, processing core 130 of co-processor 114 is operative to process graphics data, such as video and image data, as well as general purpose, non-graphical data. Processing core 130 is operative to process and present content for presentation by the monitor 138 and/or speakers 160.

Co-processor 114 includes one or more storage interfaces 154 for reading and writing presentation content and other data to accessible storage 156. For example, storage interfaces 154 may include one or more of a USB interface 154 for accessing USB storage 156, a network interface 154 for accessing network storage 156 (e.g., storage accessible over a wireless or wired network, Ethernet, Bluetooth, WiFi, cloud, etc.), a memory card interface 154 for accessing memory card storage 156 (e.g., secure digital (SD) card), a flash interface 154 for accessing flash storage 156, an optical disk interface 154 for accessing optical disk storage 156, and a serial advanced technology attachment (SATA) interface 154 for accessing SATA storage 156 (e.g., SATA hard drive). Co-processor 114 may further include onboard flash memory 158 and onboard device memory 132, such as dedicated RAM 132, accessible by processing core 130 for storing presentation content and other data. In one embodiment, co-processor 114 processes and outputs data to memory buffer 136, such as a frame buffer 136, for displaying content on a monitor 138.

In one embodiment, computing system 100 allows the access and usage of mass storage 124 by both main processor 112 and co-processor 114. As such, co-processor 114 is provided access to some or all portions of mass storage 124 for reading and writing data, such as content for presentation by co-processor 114.

Monitor 138 includes a display or screen, such as a liquid crystal display (LCD) or cathode ray tube (CRT) display, or another suitable display medium. In one embodiment, monitor 138 includes a display processor 164 operative to display content, such as images and text data, on monitor 138, as described herein. Monitor 138 also includes internal memory 166, such as RAM memory 166, for storing content for display on the monitor 138. Monitor 138 may also include a storage interface to allow display processor 164 to access external memory, such as USB memory or other suitable memory, for storing content for display. Content presentation system 100 may include one or more additional monitors 138 for displaying content with co-processor 114 and/or display processor 164.

Co-processor 114 is illustratively in communication with one or more speakers 160 for reproducing audio data. Co-processor 114 is configured to play back audio data stored in storage accessible by co-processor 114 over speakers 160. In one embodiment, main processor 112 is also in communication with speakers 160 and is configured to play back audio data over speakers 160. In this embodiment, an optional controller (e.g., processor or other logic) may manage communication between main processor 112 and speakers 160. A user interface 162 in communication with co-processor 114 includes, for example, input buttons or knobs, an infrared (IR) controller, a touchscreen, or any other suitable user input device. As described herein, the user interface 162 allows a user to control the presentation of content via the co-processor 114 in the main processor shutoff mode.

Power source 126 may include any suitable power source, such as building power or battery power, for example. Power management controller 118 includes logic for controlling power distribution to components of main processor 112. While power management controller 118 is illustratively external to main processor 112, power management controller 118 alternatively may be internal to main processor 112. In one embodiment, power management controller 118 is an advanced configuration and power interface (ACPI) based controller. Power down logic 120 of power management controller 118 is operative to control the powering down of main processor 112 in one or more power down states or modes. In an exemplary embodiment, power down logic 120 provides three power down modes, including a shutdown mode, a hibernate mode, and a sleep mode. The shutdown mode is configured to remove power from and disable all components of content presentation system 100, including for example main processor 112, co-processor 114, mass storage 124, system RAM 122, network interface 128, and monitor 138. In the hibernate mode, all power is removed from the components of content presentation system 100, but the contents of system RAM 122 are copied and saved in the mass storage device 124 or other nonvolatile storage prior to powering off the components. Upon restarting content presentation system 100 from the hibernate mode (e.g., via a user input), the stored RAM contents are copied back to system RAM 122 from the mass storage 124 such that main processor 112 is able to boot from system RAM 122. In a sleep mode, all power is removed from main processor 112, but system RAM 122 is still powered such that the contents of the system RAM 122 are not lost when the system 100 is powered down. Upon restarting content presentation system 100 from the sleep mode, main processor 112 is able to boot from system RAM 122.

In one embodiment, content presentation system 100 powers back on and exits the power down modes upon a user input (e.g., power button, movement of mouse, touchpad input, keyboard input, or other user input) being pressed or engaged by a user. For example, system 100 may include an internal power-up circuit that detects the user input signal and switches on power to the main processor and/or other components to cause main processor 112 to power back on. Other suitable methods and devices for turning on the content presentation system 100 from the power down modes may be provided.

Content presentation system 100 is configured to operate in a main processor shutoff mode for the presentation of content. When the main processor shutoff mode is selected and implemented, content presentation system 100 causes co-processor 114 (or display processor 164) to present the content while main processor 112 is powered off. Other components may also be powered off in the main processor shutoff mode. In one embodiment, prior to the presentation of the content by system 100, a user selects via a user interface (e.g., graphical user interface provided on monitor 138) either the main processor shutoff mode or a normal mode for content presentation. In the normal mode, main processor 112 and communication interface 116 are powered on and are operative to manage the content presentation and to communicate signals with co-processor 114. In the main processor shutoff mode, power is removed from main processor 112 such that main processor 112 is disabled, i.e., is not working or processing, during content presentation. In one embodiment, all power is removed from main processor 112 in the shutoff mode. In one embodiment, some power is routed to main processor 112 in the shutoff mode, but main processor 112 is disabled due to the available power being inadequate to allow main processor 112 to function. In one embodiment, content presentation system 100 causes main processor 112 to enter one of the power down modes described herein (e.g., sleep, hibernate, shutdown modes) in the main processor shutoff mode, but co-processor 114 and other suitable components (e.g., monitor 138, speakers 160, etc.) remain powered on such that co-processor 114 presents content while main processor 112 is off. Content presentation system 100 may exit the main processor shutoff mode, for example, via one or more of the exit methods described herein for exiting the sleep, hibernate, and shutdown modes.

In the illustrated embodiment, data transfer logic 150 of main processor 112 and content presentation logic for main processor shutoff mode 152 of co-processor 114 cooperate to implement the main processor shutoff mode. Data transfer logic 150 is operative to initiate the main processor shutoff mode for content presentation by transferring the content to co-processor 114 and/or storage accessible by co-processor 114 for presentation by co-processor 114 and by instructing power down logic 120 to power off main processor 112, as described herein. Data transfer logic 150 may alternatively transfer the content to display processor 164 of monitor 138 and/or to storage accessible by display processor 164 for presentation by display processor 164 on monitor 138, as described herein. Data transfer logic 150 illustratively includes image/text transfer logic 170 for transferring image and text data and multimedia transfer logic 172 for transferring multimedia data. Image/text transfer logic 170 includes a printer driver 174 for converting, or printing, the image/text data into a document or data format that is readable by co-processor 114 (or display processor 164) for presentation by co-processor 114 on monitor 138. Printer driver 174 includes software and/or firmware executed by main processor 112 to perform the data conversion to a readable format.

Multimedia transfer logic 172 is configured to encode the multimedia data prior to transferring the multimedia data. In one embodiment, encoding the multimedia data includes re-encoding (e.g., transcoding) the multimedia data from its existing format into a multimedia format that is compatible with co-processor 114. In one embodiment, multimedia transfer logic 172 includes one or more drivers that function with the operating system to encode or transcode the multimedia data. Multimedia transfer logic 172 is also operative to pre-process the multimedia data with or without encoding the data, as described herein. In one embodiment, the pre-processing and/or encoding of the multimedia data by multimedia transfer logic 172 includes configuring the resolution, compression rate, and/or other settings and configurations. In another embodiment, content presentation logic 152 of co-processor 114 encodes the multimedia data after receiving the data from main processor 112.

Content presentation logic for main processor shutoff mode 152 is operative to manage the operation of co-processor 114 in the main processor shutoff mode for content presentation. Content presentation logic 152 receives a request signal from data transfer logic 150 to present the transferred content in the main processor shutoff mode. Content presentation logic 152 is operative to maintain power to co-processor 114 and to manage/maintain interface signals (e.g., from interface 116) in response to receiving the request. Content presentation logic 152 instructs processing core(s) 130 to present the content with main processor 112 disabled.

Figure 3:
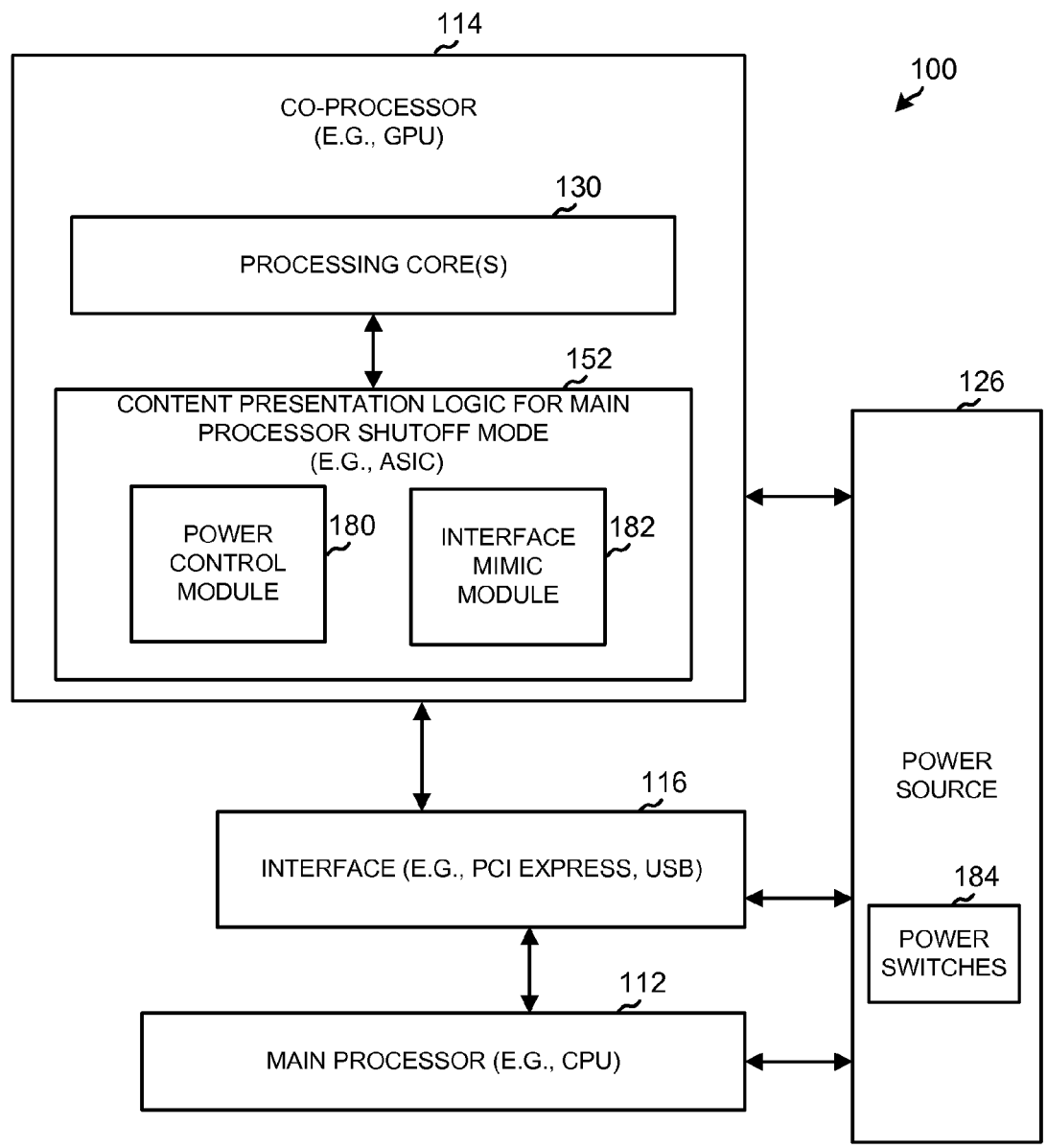
FIG. 3 is a block diagram illustrating exemplary content presentation logic of the co-processor of FIG. 2.

Referring to FIG. 3, content presentation logic 152 of co-processor 114 illustratively includes a power control module 180 and an interface mimic module 182. A plurality of switches 184 internal or external to power source 126 are controlled by main processor 112 and co-processor 114 to selectively route power to various components of computing system 100. Power control module 180 of content presentation logic 152 is operative to maintain power to co-processor 114 when power is removed from main processor 112 in the main processor shutoff mode by controlling one or more power switches 184 of power source 126. For example, in response to the request for presentation of content in the main processor shutoff mode, power control module 180 sends one or more control signals to one or more power switches 184 such that power source 126 routes power to co-processor 114 and any other components as specified by power control module 180. As such, power control module 180 causes power source 126 to continue to provide power to co-processor 114 and to any other components (e.g., accessible storage 156, monitor 138, speakers 160) that are required for presentation of content in the main processor shutoff mode. In another embodiment, at least a portion of power control module 180 may be located external to co-processor 114. In one embodiment, main processor 112 sends control signals to power switches 184 prior to entering the power down mode to control the routing of power for content presentation.

Interface mimic module 182 of co-processor 114 is operative to maintain and/or block interface signals from interface 116 in the main processor shutoff mode. For example, interface mimic module 182 mimics or maintains signal states of interface signals normally initiated by main processor 112 in the normal operation mode. In one embodiment, interface mimic module 182 also blocks or turns off unwanted signals that may be received by co-processor 114 from interface 116 when main processor 112 is disabled. As such, in the illustrated embodiment, content presentation logic 152 prevents or reduces the likelihood that the content presentation operation of co-processor 114 is inhibited by powering off main processor 112 and other components of computer system 100.

In one embodiment, content presentation logic 152 receives the user inputs from user interface 162 and routes corresponding control commands to processing core 130 for controlling playback or display of the content in the main processor shutoff mode. In another embodiment, processing core 130 receives the user inputs without intervention by content presentation logic 152 and controls playback or display of the content based on the user inputs.

In one embodiment, content presentation logic 152 includes hardware such as an application specific integrated circuit (ASIC) for running hardware logic, such as register transfer language (RTL) based logic, for example. While content presentation logic 152 is illustratively internal to co-processor 114, logic 152 may alternatively be external to co-processor 114. For example, logic 152 may be located between main processor 112 and interface 116 of system 100 to manage operation of co-processor 114 via interface 116 in the main processor shutoff mode. In addition, power switches 184 may be located in other suitable locations external to power source 126 and in communication with content presentation logic 152 for selectively routing power to components of computer system 100.

In an embodiment wherein display processor 164 presents the content with both co-processor 114 and main processor 112 disabled, display processor 164 includes content presentation logic for managing power to monitor 138 and instructing the display processor 164 to display the content in the main processor shutoff mode.

In one embodiment, data transfer logic 150 of main processor 112 is operative to transfer the content directly to storage accessible by co-processor 114, such as to network storage, USB storage, system RAM 122, or mass storage 124, for example. In another embodiment, data transfer logic 150 transfers the content directly to co-processor 114, and co-processor 114 routes and stores the content in accessible storage (e.g., storage 156). In one embodiment, co-processor 114 includes storage control logic 176 (FIG. 2) operative to receive the content from main processor 112 and to route the content to storage accessible by co-processor 114, such as accessible storage 156 described herein. In one embodiment, storage control logic 176 routes the content to accessible storage 156 to which main processor 112 does not have access. Alternatively, storage control logic 176 may control a multiplexer circuit of co-processor 114 to selectively allow access to storage 156 by main processor 112 and co-processor 114 for routing the content to storage 156. In one embodiment, data transfer logic 150 transfers the content directly to a first storage location accessible by co-processor 114 (e.g., mass storage 124, system RAM 122, etc.), and co-processor 114 moves the content to a second storage location (e.g., accessible storage 156, flash memory 158, dedicated memory 132, etc.) for access during content presentation in the main processor shutoff mode. As such, power may be removed from the first storage location in the main processor shutoff mode while co-processor 114 presents the content from the second storage location.

In one embodiment, data transfer logic 150 stores the content in portable storage accessible by main processor 112, and a user moves the portable storage to a port of computer system 100 accessible by co-processor 114. For example, upon data transfer logic 150 storing the content to a USB dongle or other portable storage device, the user may move the USB dongle to a different input port of computer system 100 for access by co-processor in the main processor shutoff mode.

Figure 4:
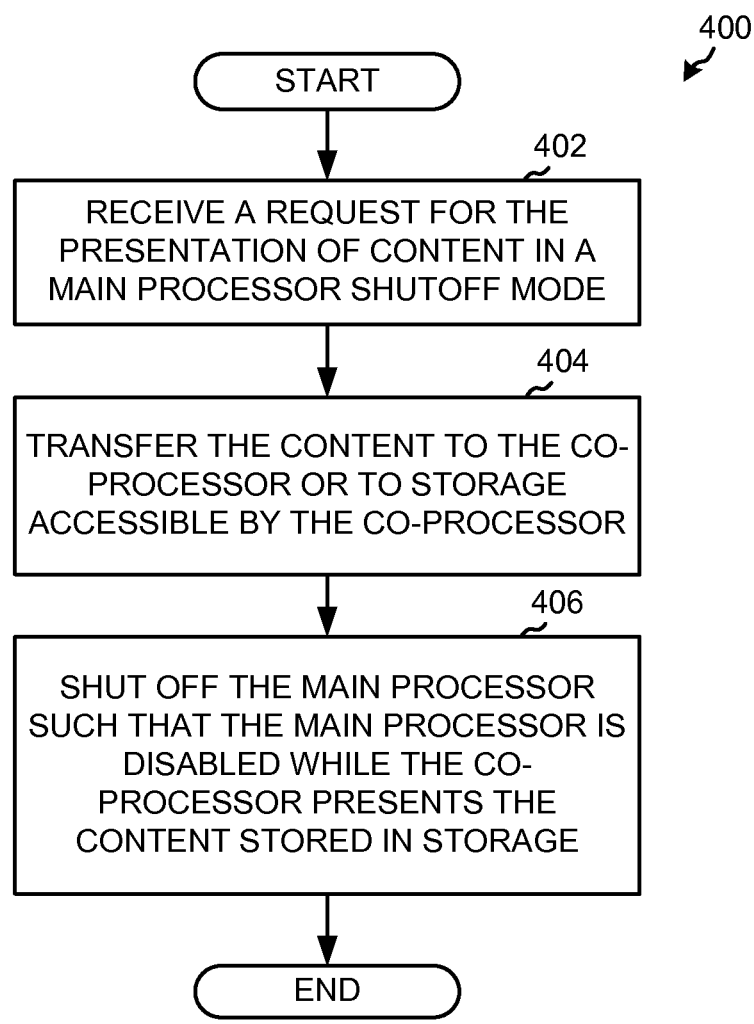
FIG. 4 is a flow chart of an exemplary method of operation of the data transfer logic of FIG. 2 for content presentation in the main processor shutoff mode.

FIG. 4 illustrates a flow diagram 400 of an exemplary operation performed by data transfer logic 150 of main processor 112 of FIG. 2 for content presentation in the main processor shutoff mode. Reference is made to FIG. 2 throughout the description of FIG. 4. At block 402, data transfer logic 150 receives a request for the presentation of content in the main processor shutoff mode. In one embodiment, the request includes a signal received at data transfer logic 150 from main processor 112 based on a user selection received via a user interface (e.g., keyboard, mouse, touch screen, etc.) for the presentation of content in the main processor shutoff mode. The request may also be automatically generated by main processor 112. At block 404, data transfer logic 150 transfers the content to a co-processor (co-processor 114 or display processor 164) or to storage accessible by the co-processor (e.g., storage 156, memory buffer 136, system RAM 122, mass storage 124, etc.). In one embodiment, the transferred content includes the complete data or file to be presented such that the co-processor receives the entire content prior to the main processor shutting off. The transfer of content may include sending a request signal to the co-processor instructing the co-processor to present the received content in the main processor shutoff mode. At block 406, data transfer logic 150 shuts off main processor 112 such that main processor 112 is disabled while co-processor 114 or display processor 164 presents the content stored in the storage. In one embodiment, data transfer logic 150 shuts off main processor 112 by instructing power down logic 120 to power off main processor 112, such as, for example, by entering one of the hibernate, sleep, or shutdown modes described herein. With main processor 112 powered off, co-processor 114 or display processor 164 is operative to present the content, as described herein.

Figure 5:
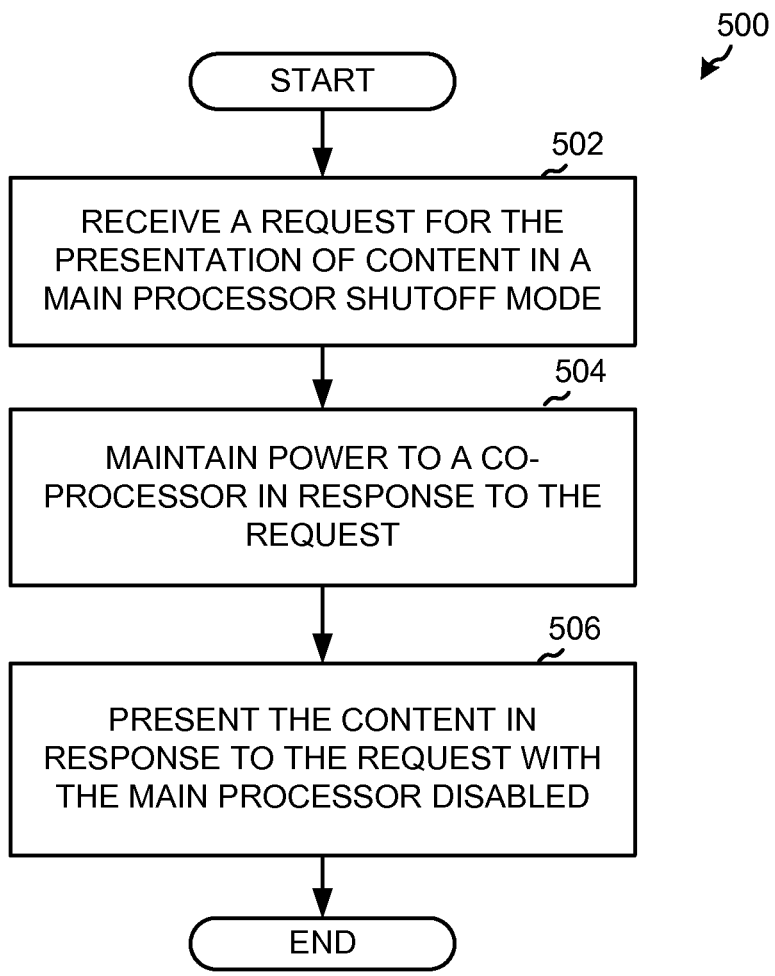
FIG. 5 is a flow chart of an exemplary method of operation of the co-processor of FIG. 2 for content presentation in the main processor shutoff mode.

FIG. 5 illustrates a flow diagram 500 of an exemplary operation performed by co-processor 114 of FIG. 2 for content presentation in the main processor shutoff mode. Reference is made to FIG. 2 throughout the description of FIG. 5. At block 502, content presentation logic 152 receives the request signal from data transfer logic 150 for the presentation of content in the main processor shutoff mode. In one embodiment, the request is sent by data transfer logic 150 prior to or with the content transfer by data transfer logic 150. At block 504, content presentation logic 152 maintains power to co-processor 114 in response to the request. For example, power control module 180 of content presentation logic 152 enables power to co-processor 114 (and other suitable components) while main processor 112 is powered off, as described herein. At block 506, co-processor 114 presents the content in response to the request signal with main processor 112 disabled. For example, co-processor 114 displays image/text data on monitor 138 and/or plays back multimedia data over monitor 138 and/or speakers 160.

Figure 6:
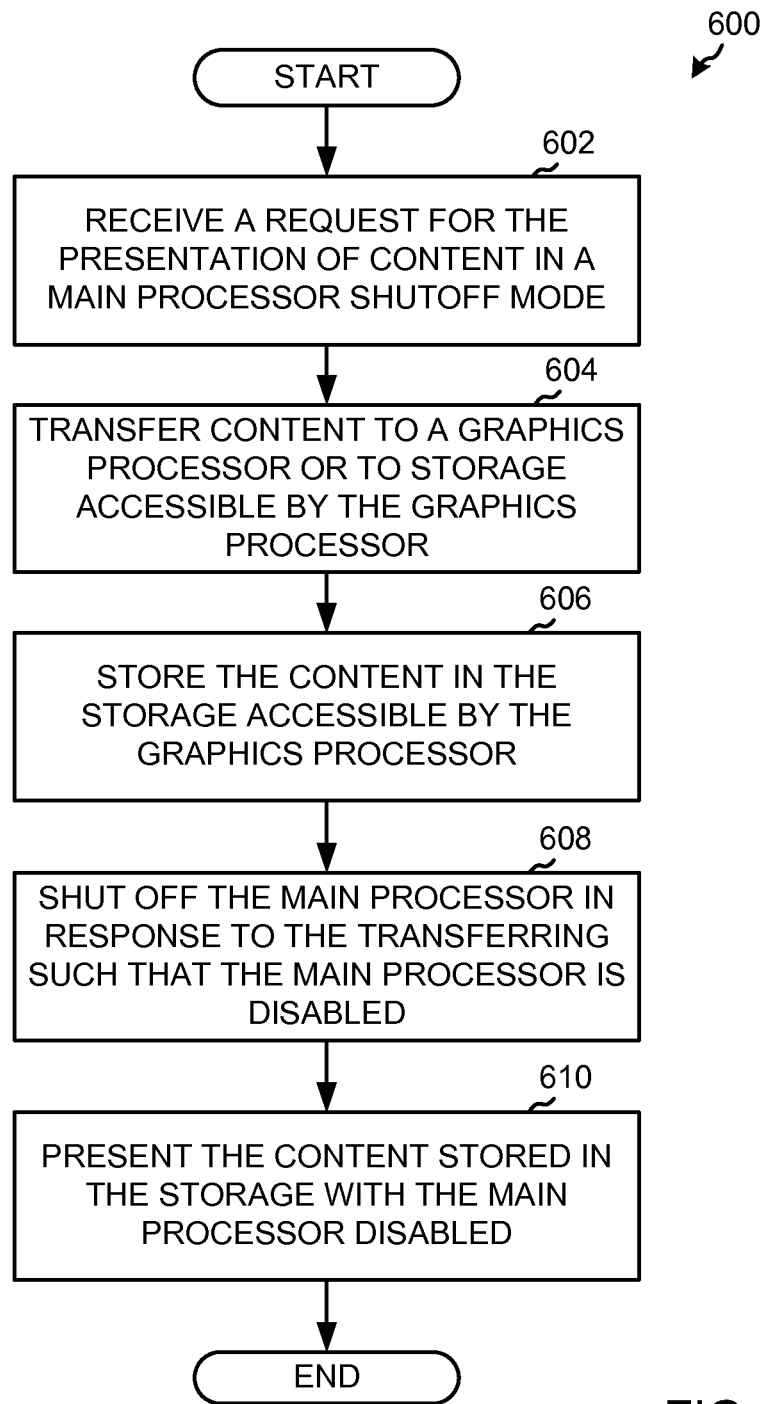
FIG. 6 is a flow chart of an exemplary method of operation of the content presentation system of FIG. 2 for presenting content in the main processor shutoff mode.

FIG. 6 illustrates a flow diagram 600 of an exemplary operation performed by main processor 112 and co-processor 114 of FIG. 2 for content presentation in the main processor shutoff mode. Reference is made to FIG. 2 throughout the description of FIG. 6. At block 602, data transfer logic 150 receives the request for the presentation of content in the main processor shutoff mode, as described herein. At block 604, data transfer logic 150 transfers the content to a graphics processor (e.g., co-processor 114) or to storage accessible by the graphics processor, as described herein. At block 606, the graphics processor (or data transfer logic 150) stores the content in the storage accessible by the graphics processor, as described herein. At block 608, data transfer logic 150 shuts off main processor 112 in response to transferring the content such that main processor 112 is disabled, as described herein. At block 610, the graphics processor presents the content stored in the storage with main processor 112 disabled.

Figure 7:
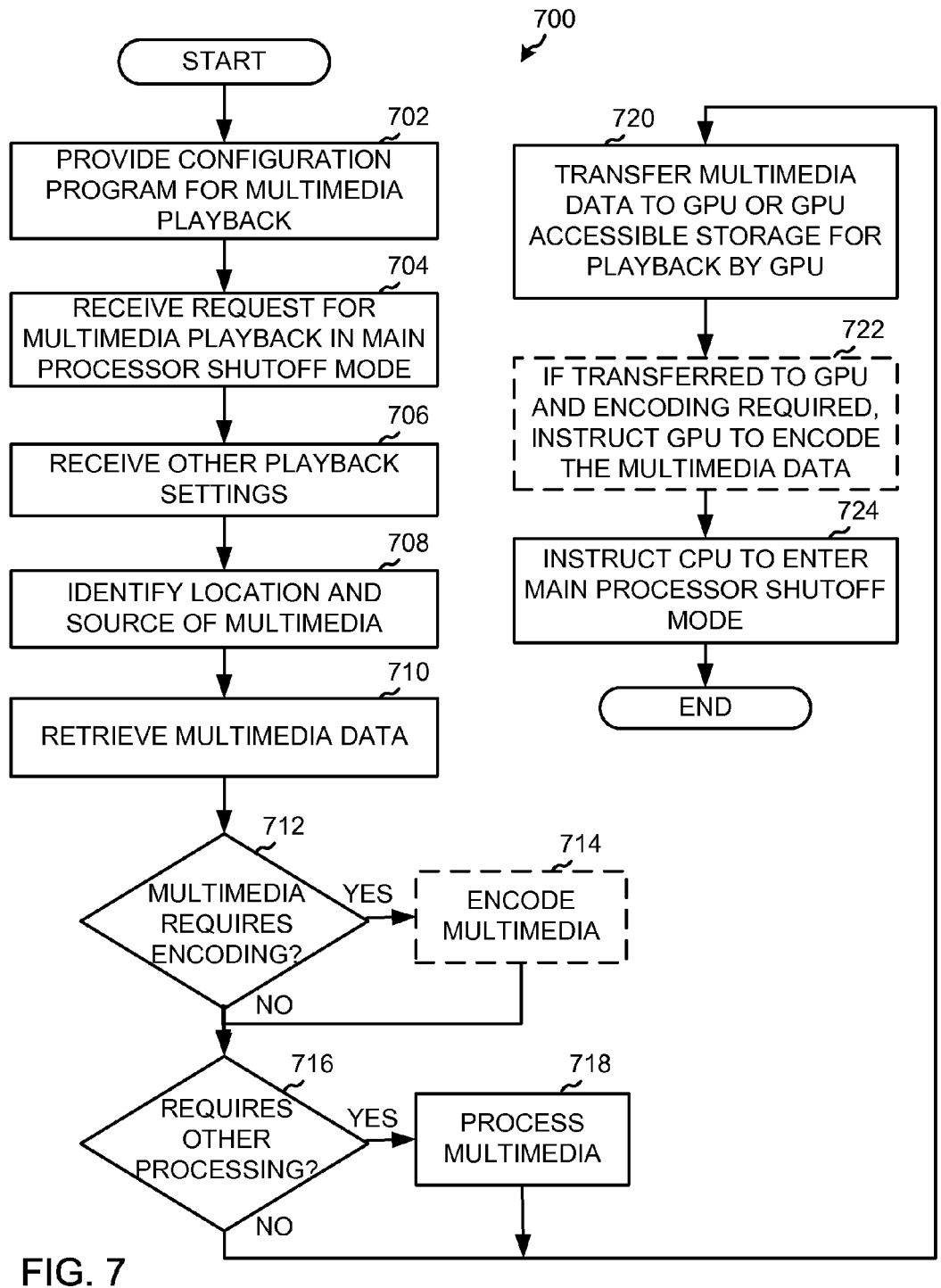
FIG. 7 is a flow chart of another exemplary method of operation of the data transfer logic of FIG. 2 for playing back multimedia data in the main processor shutoff mode.

FIG. 7 illustrates a flow diagram 700 of an exemplary detailed embodiment of the method of FIG. 4 performed by data transfer logic 150 of main processor 112, and in particular by multimedia transfer logic 172, for playing back multimedia data in the main processor shutoff mode. Reference is made to FIG. 2 throughout the description of FIG. 7. At block 702, content presentation system 100 executes a configuration program for multimedia playback. In one embodiment, the configuration program provides a graphical user interface displayed on monitor 138 to allow a user to select playback settings. For example, the configuration program may display a window on monitor 138 providing for selection of multiple configuration settings. In one embodiment, the configuration program automatically executes upon a user initiating playback of audio or video from a multimedia source, such as from storage or from a network. In the configuration program, the user selects playback in one of the main processor shutoff mode and the normal operation mode described herein (i.e., by selecting a graphical user input, for example). At block 704, multimedia transfer logic 172 receives a request for multimedia playback in the main processor shutoff mode based on the user selection. At block 706, multimedia transfer logic 172 receives other playback settings based on the user selections, such as desired resolution, compression rate, and/or other settings and configurations.

At block 708, multimedia transfer logic 172 identifies the location and source of the multimedia data. In one embodiment, the multimedia source includes storage accessible by main processor 112, such as mass storage 124, system RAM 122, removable storage (e.g., USB, optical drive, flash, etc.). In one embodiment, the multimedia is at a remote location accessible over a network (e.g., Internet, local area network, etc.) via network interface 128. A user may specify the location and source of the multimedia via the configuration program provided at block 702, or the location and source of the multimedia may be identified automatically by multimedia transfer logic 172 upon initiation of playback of the multimedia by the user. At block 710, multimedia transfer logic 172 retrieves the multimedia data from the source. The retrieved multimedia data may be temporarily stored in onboard memory of main processor 112 or in memory accessible by main processor 112, such as system RAM 122 for example.

At block 712, multimedia transfer logic 172 determines whether the retrieved multimedia data requires encoding prior to entering the main processor shutoff mode. In one embodiment, main processor 112 analyzes the multimedia data to determine the data format and compares the format to the data format(s) compatible with co-processor 114. If the multimedia data format is incompatible, or if the data is to be compressed to a different quality and/or size, multimedia transfer logic 172 determines that encoding is required at block 712. In one embodiment, multimedia transfer logic 172 determines whether to encode the multimedia data based on a user selection requesting the multimedia data be encoded to a multimedia format readable by co-processor 114, or based upon a user selection requesting a lesser data quality or size of the multimedia data. Upon determining that the multimedia requires encoding at block 712, main processor 112 optionally encodes the multimedia data at block 714 to a format compatible/readable with co-processor 114. Alternatively, main processor 112 may instruct co-processor 114 to encode the multimedia data upon receipt by co-processor 114 (shown at block 722). As described herein, encoding may include transcoding the multimedia from one format to another.

Multimedia transfer logic 172 determines if additional pre-processing of the multimedia data is required at block 716. If pre-processing is required, multimedia transfer logic 172 pre-processes the multimedia data at block 718. Alternatively, multimedia transfer logic 172 may instruct co-processor 114 to pre-process the data (at block 722) based on the determination at block 716. Pre-processing may include processing the multimedia data based on the configuration settings received at block 706 or to otherwise facilitate playback by co-processor 114. In one embodiment, pre-processing includes removing content from the multimedia data, such as content identified by the user (based on user inputs) or content unnecessary for playback, to reduce the data size and/or improve the compatibility of the data with co-processor 114. For example, multimedia transfer logic 172 may pre-process the data to remove content such as foreign language data, subtitle data, menu data, driver program data, and/or other extra content.

Blocks 714 and 718 may optionally be provided in a single step wherein the encoding and pre-processing are performed together, either by main processor 112 or co-processor 114. In some embodiments, encoding and/or pre-processing the multimedia data facilitates the conversion of any multimedia format, such as a proprietary format, to a format readable and executable by co-processor 114. In some embodiments, the multimedia data is not encoded or pre-processed prior to presentation by co-processor 114. For example, internet audio/video or other suitable multimedia types may not require encoding or pre-processing in some embodiments.

At block 720, multimedia transfer logic 172 transfers the multimedia data to either co-processor 114 or to storage accessible by co-processor 114, as described herein. In addition to transferring the data, multimedia transfer logic 172 also sends a request to co-processor 114 to present the data in the main processor shutoff mode. At block 722, multimedia transfer logic 172 may instruct co-processor 114 to encode and/or pre-process the multimedia data prior to presentation based on the determinations made at blocks 712 and 716. At block 724, multimedia transfer logic 172 instructs power down logic to enter the main processor shutoff mode, as described herein, thereby powering off main processor 112 as well as other components (e.g., mass storage 124, network interface 128, interface 116, and/or system RAM 122, etc.) that are not required for presentation of the multimedia data by co-processor 114. Co-processor 114 then proceeds to play back the multimedia data in the main processor shutoff mode, as described herein. A user may control playback via user inputs provided with user interface 162 (e.g., play, pause, stop, volume, skip, scan, exit, etc.), as described herein.

Figure 8:
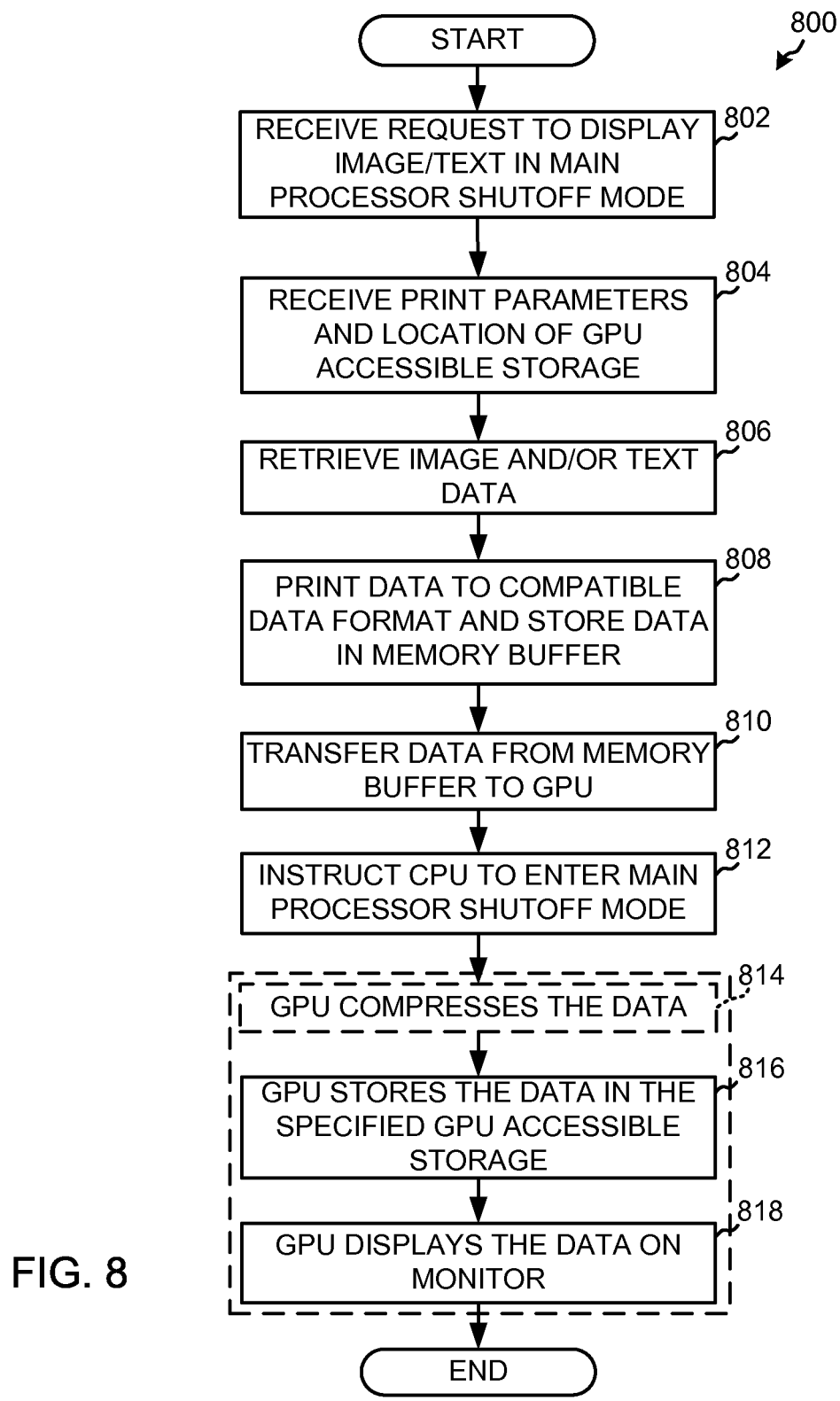
FIG. 8 is a flow chart of another exemplary method of operation of the data transfer logic and co-processor of FIG. 2 for displaying image and text data in the main processor shutoff mode.

FIG. 8 illustrates a flow diagram 800 of an exemplary detailed embodiment of the method of FIG. 4 performed by data transfer logic 150 of main processor 112, and in particular by image/text transfer logic 170, for displaying image and text data on monitor 138 in the main processor shutoff mode. Reference is made to FIG. 2 throughout the description of FIG. 8. While co-processor 114 is referenced in FIG. 8 as displaying the image/text data, display processor 164 may alternatively present the image/text data in the main processor shutoff mode with co-processor 114 and main processor 112 powered off.

At block 802, image/text transfer logic 170 receives a request to display the image/text data in the main processor shutoff mode. In one embodiment, the request is initiated by a user using a print function provided by printer driver 174 of main processor 112, although other suitable mechanisms for requesting the content presentation may be provided (e.g., other graphical user interface input, keyboard input, etc.). Using the print function, the image/text data is converted by printer driver 174 to a data format readable by co-processor 114 for display in the main processor shutoff mode, as described herein. For example, a user makes a selection via the user interface to print the image/text data provided in an application. The application may be any suitable application executed by main processor 112, including but not limited to a photo viewing application, a document viewing application, an electronic book/publication viewing application, an internet browser application, etc. Upon user selection to print the image/text data, printer driver 174 of image/text transfer logic 170 provides a print configuration program including a user interface, such as a graphical user interface displayed on monitor 138, allowing a user to configure print settings and parameters. Exemplary settings and parameters include, for example, an option to display the data in the main processor shutoff mode or in the normal operation mode as well as a target storage location for the converted image/text data that is accessible by co-processor 114 in the main processor shutoff mode. In one embodiment, selection of the main processor shutoff mode in the print configuration program by the user initiates the display request of block 802. Other exemplary settings configured via the print configuration program may include a display quality of the data, a file name, page range, document size, zoom settings, color settings, and other suitable settings. At block 804, printer driver 174 receives the print parameters and the target storage location specified by the user via the print configuration program.

At block 806, printer driver 174 identifies the source location of the image and/or text data and retrieves the image and/or text data from the source. In one embodiment, the image/text source location includes storage accessible by main processor 112, such as mass storage 124, system RAM 122, removable storage (e.g., USB, optical drive, flash, etc.). In one embodiment, the image/text data is at a remote location accessible over a network (e.g., Internet, local area network, etc.) via network interface 128. A user may specify the source location of the image/text data via the printer configuration program, or the source location of the image/text data may be identified automatically by image/text transfer logic 170 upon initiation of the print function by the user. The retrieved image/text data may be temporarily stored in onboard memory of main processor 112 or in other memory accessible by main processor 112, such as system RAM 122 for example.

At block 808, printer driver 174 prints (i.e., converts) the retrieved image/text from an initial format to a data format compatible with co-processor 114 based on the configuration settings and stores the converted image/text data (e.g., the electronic printout) in a memory buffer of computing system 100. In one embodiment, the memory buffer is accessible by co-processor 114. Other suitable pre-processing of the image/text data may be performed at block 808. In one embodiment, image/text transfer logic 170 is operative to recognize that the image/text data is already in a suitable format compatible with co-processor 114, and thus converting the image/text data to a different format at block 808 is not performed. At block 810, image/text transfer logic 170 transfers the image/text data from the memory buffer to co-processor 114 or to storage accessible by co-processor 114, as described herein. In one embodiment, co-processor 114 retrieves the image/text data from the memory buffer. In addition to transferring the data, image/text transfer logic 170 also sends a request to co-processor 114 to present the data in the main processor shutoff mode. In one embodiment, image/text transfer logic 170 may also instruct co-processor 114 to further process and/or compress the image/text data prior to presentation based on the configuration settings received at block 804. At block 812, image/text transfer logic 170 instructs power down logic 120 to enter the main processor shutoff mode, as described herein, thereby powering off main processor 112 as well as other components (e.g., mass storage 124, network interface 128, interface 116, and/or system RAM 122, etc.) that are not required for presentation of the image/text data by co-processor 114.

In the illustrated embodiment of FIG. 8, blocks 814 to 818 are performed by co-processor 114. At block 814, co-processor 114 optionally compresses or otherwise further processes the received image/text data based on instructions from image/text transfer logic 170. At block 816, co-processor 114 stores the image/text data in the target storage location specified by the user. Alternatively, image/text transfer logic 170 of main processor 112 may transfer the image/text data directly to the target storage location (at block 810). At block 818, co-processor 114 proceeds to display the image/text data in the main processor shutoff mode, as described herein. A user may control the display of the image/text content via user inputs provided with user interface 162 (e.g., play, pause, stop, scroll, page up/down, orientation, zoom, exit, etc.), as described herein.

In one embodiment, the printer driver 174 facilitates the conversion of any image/text data format (e.g., .doc, .pdf, .jpeg, .tif, .png, .gif, .bmp, or any other suitable data or file format) to a data format readable and executable by co-processor 114. For example, printer driver 174 may convert the image/text data from a proprietary format, a publicly available format, or other format to one or more formats compatible with co-processor 114. In one embodiment, the data format is not converted upon a determination that co-processor 114 is compatible with the source format for displaying the content.

In one embodiment, co-processor 114 has access to another power supply, such as a battery or other suitable power supply, that is separate from power source 126. In one embodiment, co-processor 114, as well as monitor 138 and/or speakers 160, are detachable as a unit from main processor 112 and from other components of content presentation system 100, thereby providing a portable and more compact content presentation system physically detached from main processor 112. As such, after initiating the main processor shutoff mode described herein, co-processor 114 is configured to present the content while being physically detached from main processor 112. In this embodiment, the detached co-processor 114 and monitor 138 are coupled to a removable or separate power supply, such as a battery, or may be coupled to a plug-in power source, for example. An electrical connector interface is provided that allows co-processor 114 and monitor 138 to be decoupled from main processor 112 and from other components of system 100, such as interface 116, system RAM 122, and/or mass storage 124. For example, the electrical connector interface may be provided between communication interface 116 and co-processor 114 or between communication interface 116 and main processor 112. Upon re-attaching co-processor 114 to main processor 112 at the electrical connector interface, the main processor shutoff mode may be exited and normal computer operation may resume.

Among other advantages in certain embodiments, the method and system of the present disclosure allow for the presentation of multiple types and formats of content by a computing system with one or more components of the computing system powered off. Exemplary powered off components include the main processor, the mass storage device, other memory, network and/or communication interfaces, and/or other suitable components. As such, the method and system serve to minimize or reduce power consumption by the computing system during content presentation. In addition, the method and system serve to present multiple formats of content by converting incompatible content formats into content formats that are compatible for presentation by the computing system. Other advantages will be recognized by those of ordinary skill in the art.

While this invention has been described as having preferred designs, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this disclosure pertains and which fall within the limits of the appended claims.

What is claimed is:

1. A method of content presentation by a computer system, the method comprising:
    transferring, by a main processor of the computer system, content to at least one of: a graphics processor and storage accessible by the graphics processor in response to a request for presentation of the content in a main processor shutoff mode, the content being stored in the storage accessible by the graphics processor for presentation by the graphics processor in the main processor shutoff mode, the content comprising at least one of: multimedia data, text data, and image data;
    shutting off the main processor in response to the transferring of content such that the main processor is disabled while the graphics processor presents the content stored in the storage; and
    executing, in response to the request, a configuration program operative to configure settings for the presentation of the content by the graphics processor based on at least one user selection received via a user interface that selects a target storage location, the settings including an identification of the target storage location accessible by the graphics processor for storing the content.

2. The method of claim 1, wherein the content comprises multimedia data, the method further comprising, in response to the request, transcoding the multimedia data into a multimedia format readable by the graphics processor, wherein the transferring comprises transferring the transcoded multimedia data to the at least one of: the graphics processor and the storage accessible by the graphics processor.

3. The method of claim 1, wherein the content comprises multimedia data, the method further comprising instructing, by the main processor, the graphics processor to transcode the multimedia data into a multimedia format readable by the graphics processor and to store the transcoded multimedia data in the storage accessible by the graphics processor.

4. The method of claim 1, wherein the content comprises multimedia data, the method further comprising pre-processing, by the main processor prior to the transferring, the multimedia data to remove content from the multimedia data, the removed content including at least one of: foreign language data, subtitle data, menu data, and driver program data.

5. The method of claim 1, wherein the content comprises at least one of: image data and text data, and in the main processor shutoff mode the graphics processor is operative to display the at least one of: image data and text data on a computer monitor of the computer system with the main processor disabled, the method further comprising converting, with a printer driver of the main processor, the at least one of: image data and text data into a data format readable by the graphics processor, wherein the transferring the at least one of: image data and text data comprises transferring the converted data to the at least one of: the graphics processor and the storage accessible by the graphics processor.

6. The method of claim 5, wherein the transferring comprises transferring the converted data to a memory buffer accessible by the graphics processor, the graphics processor retrieving the converted data from the memory buffer for displaying the converted data on a computer monitor.

7. The method of claim 1, wherein the computer system further comprises power down logic, wherein the shutting off the main processor comprises sending a power down request to the power down logic, the power down logic being operative to switch off power to the main processor in response to the power down request.

8. The method of claim 1, wherein the transferring further comprises instructing content presentation logic of the graphics processor to maintain power to the graphics processor in the main processor shutoff mode and to present the content with the main processor powered off.

9. The method of claim 1, wherein the content includes image data.

10. The method of claim 1, wherein the main processor shutoff mode provides that all power is removed from the main processor.

11. A method of content presentation by a computer system, the method comprising:
receiving, by content presentation logic of a computer system, a request for presentation of content in a main processor shutoff mode, the content comprising at least one of: multimedia data, text data, and image data;
maintaining power to a graphics processor in response to the request for presentation of the content in the main processor shutoff mode;
presenting, by the graphics processor in response to the request, the content while the main processor is disabled, wherein the main processor shutoff mode provides that all power is removed from the main processor; and
selecting a target storage location accessible by the graphics processor for storing the content, the selection based on an input received from a user interface.

12. The method of claim 11, wherein, in a normal operation mode with the main processor enabled, a communication interface is operative to communicate signals to the graphics processor based on signals received from the main processor, the method further comprising providing, by the content presentation logic in the main processor shutoff mode, signals to the graphics processor that mimic the signals communicated to the graphics processor via the communication interface in the normal operation mode.

13. The method of claim 11, wherein the maintaining power to the graphics processor comprises controlling a power switch of the computer system to route power from a power source to the graphics processor to power the graphics processor while power is removed from the main processor.

14. The method of claim 11, further comprising receiving, by the graphics processor, the content from the main processor and storing the content in storage accessible by the graphics processor for presentation by the graphics processor in the main processor shutoff mode.

15. The method of claim 11, wherein the content comprises multimedia data, the method further comprising transcoding, by the graphics processor prior to the presenting, the multimedia data into a multimedia format readable by the graphics processor and storing the transcoded multimedia data in the storage accessible by the graphics processor.

16. The method of claim 11, wherein the content presentation logic is internal to the graphics processor.

17. A method of content presentation by a computer system, the method comprising:
transferring, by a main processor of the computer system, content to at least one of: a graphics processor of the computer system and storage accessible by the graphics processor in response to a request for presentation of the content in a main processor shutoff mode, the content comprising at least one of: multimedia data, text data, and image data;
storing the content in the storage accessible by the graphics processor for presentation by the graphics processor in the main processor shutoff mode;
shutting off the main processor in response to the transferring of content such that all power is removed from the main processor and the main processor is disabled;
presenting, by the graphics processor, the content stored in the storage while the main processor is disabled; and
selecting a target storage location accessible by the graphics processor for storing the content, the selection based on an input received from a user interface.

18. The method of claim 17, wherein the content comprises multimedia data, the method further comprising transcoding the multimedia data into a multimedia format readable by the graphics processor prior to the presenting.

19. The method of claim 17, wherein, in a normal operation mode with the main processor enabled, a communication interface is operative to communicate signals to the graphics processor based on signals received from the main processor, the method further comprising providing, by content presentation logic in the main processor shutoff mode, signals to the graphics processor that mimic the signals communicated to the graphics processor via the communication interface in the normal operation mode.

20. The method of claim 17, wherein a communication interface is coupled between the main processor and the graphics processor, the method further comprising blocking signals from the communication interface to the graphics processor in the main processor shutoff mode.

21. The method of claim 17, further comprising controlling a power switch of the computer system to route power from a power source to the graphics processor to power the graphics processor in the main processor shutoff mode while power is removed from the main processor.

22. The method of claim 17, wherein the main processor is in communication with at least one of: a hard drive and a network interface for remote communication, and the at least one of: the hard drive and the network interface are powered off when the main processor is disabled.

23. The method of claim 17, further including exiting the main processor shutoff mode based on user input received via a user interface, wherein the exiting the main processor shutoff mode includes powering on the main processor.

24. A computer system for content presentation, the system comprising:
a main processor in communication with a graphics processor of the computer system and including data transfer logic, the data transfer logic being operative to transfer content to at least one of: the graphics processor and storage accessible by the graphics processor in response to a request for presentation of the content in a main processor shutoff mode, the content being stored in the storage accessible by the graphics processor for presentation by the graphics processor in the main processor shutoff mode, the content comprising at least one of: multimedia data, text data, and image data, the data transfer logic being further operative to shut off the main processor in response to the transferring of content such that the main processor is disabled while the graphics processor presents the content stored in the storage, wherein the main processor includes memory containing executable instructions that when executed by the main processor cause the main processor to provide a graphical user interface that receives at least one user selection for a target storage location, comprising selectable configuration data for the content presentation based on the at least one user selection received via the graphical user interface, wherein the data control logic identifies the target storage location accessible by the graphics processor for storing the content based on a user selection of the selectable configuration data.

25. The computer system of claim 24, wherein the content comprises multimedia data, the data transfer logic being further operative to, in response to the request, transcode the multimedia data into a multimedia format readable by the graphics processor, wherein the data transfer logic transfers the content by transferring the transcoded multimedia data to the at least one of: the graphics processor and the storage accessible by the graphics processor.

26. The computer system of claim 23, wherein the content comprises multimedia data, the data transfer logic being further operative to instruct the graphics processor to transcode the multimedia data into a multimedia format readable by the graphics processor and to store the transcoded multimedia data in the storage accessible by the graphics processor.

27. The computer system of claim 24, further comprising a computer monitor in communication with the graphics processor, wherein the content comprises at least one of: image data and text data, and in the main processor shutoff mode the graphics processor is operative to display the at least one of: image data and text data on the computer monitor with the main processor disabled, and the main processor includes a printer driver operative to convert the at least one of: image data and text data into a data format readable by the graphics processor prior to transferring the at least one of: image data and text data.

28. The computer system of claim 24, wherein the data transfer logic is further operative to instruct content presentation logic of the graphics processor to maintain power to the graphics processor in the main processor shutoff mode and to present the content with the main processor powered off.

29. The computer system of claim 24, wherein the graphics processor comprises at least one of: a graphics processor and a computer monitor processor, the computer monitor processor being provided in a computer monitor of the computer system.

30. A computer system for content presentation, the system comprising:
a graphics processor in communication with a main processor of the computer system and including content presentation logic, the content presentation logic being operative to receive a request for presentation of content in a main processor shutoff mode where all power is removed from the main processor and to maintain power to the graphics processor in response to the request, the content comprising at least one of: multimedia data, text data, and image data, the graphics processor being operative to present the content in response to the request while the main processor is disabled, the main processor configured to select a target storage location accessible by the graphics processor for storing the content, the selection based on an input received from a user interface.

31. The computer system of claim 30, further including a communication interface, wherein, in a normal operation mode with the main processor enabled, the communication interface is operative to communicate signals to the graphics processor based on signals received from the main processor, the content presentation logic being further operative to provide, in the main processor shutoff mode, signals to the graphics processor that mimic the signals communicated to the graphics processor via the communication interface in the normal operation mode.

32. The computer system of claim 30, wherein the content presentation logic maintains power to the graphics processor by controlling a power switch of the computer system to route power from a power source to the graphics processor to power the graphics processor while power is removed from the main processor.

33. The computer system of claim 30, wherein the content comprises multimedia data, the graphics processor being operative to, prior to presenting the multimedia data, transcode the multimedia data into a multimedia format readable by the graphics processor and store the transcoded multimedia data in the storage accessible by the graphics processor.

34. A computer system for content presentation, the system comprising:
a graphics processor;
storage accessible by the graphics processor; and
a main processor in communication with the graphics processor and including data transfer logic, the data transfer logic being operative to transfer content to at least one of: the graphics processor and the storage accessible by the graphics processor in response to a request for presentation of the content in a main processor shutoff mode, wherein the transferred content is stored in the storage accessible by the graphics processor, the data transfer logic being further operative to shut off the main processor in response to the transferring of content such that all power is removed from the main processor and operation of the main processor is disabled in the main processor shutoff mode, the graphics processor being operative to present the content stored in the storage in the main processor shutoff mode with the main processor disabled, the content comprising at least one of: multimedia data, text data, and image data, the main processor configured to select a target storage location accessible by the graphics processor for storing the content, the selection based on an input received from a user interface.

35. The computer system of claim 34, wherein the content comprises multimedia data, and at least one of: the main processor and the graphics processor are operative to transcode the multimedia data into a multimedia format readable by the graphics processor prior to presentation of the content by the graphics processor.

36. The computer system of claim 34, wherein the graphics processor includes content presentation logic operative to control presentation of the content in the main processor shutoff mode based on user inputs received via a user interface.

37. The computer system of claim 34, further including a network interface for remote communication and a hard drive each in communication with the main processor, wherein the main processor is operative to power off at least one of: the hard drive and the network interface in response to transferring the content.

38. The computer system of claim 34, further comprising at least one power switch configured to selectively route power from a power source to the main processor and the graphics processor, at least one of: the main processor and the graphics processor being operative to control the at least one power switch to route power from the power source to the graphics processor to power the graphics processor in the main processor shutoff mode while power is removed from the main processor.

39. The computer system of claim 34, wherein the main processor and graphics processor are provided on a single chip.

40. The computer system of claim 34, further comprising a monitor in communication with the graphics processor for displaying the content presented by the graphics processor and an electrical connector interface coupling the graphics processor and the monitor to the main processor, wherein the graphics processor is operative to present the content while being detached from the main processor at the electrical connector interface.

* * * * *